(12) United States Patent
Olschewski

(10) Patent No.: US 7,221,784 B2
(45) Date of Patent: May 22, 2007

(54) METHOD AND ARRANGEMENT FOR MICROSCOPY

(75) Inventor: Frank Olschewski, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 809 days.

(21) Appl. No.: 10/604,314

(22) Filed: Jul. 10, 2003

(65) Prior Publication Data

US 2004/0109169 A1   Jun. 10, 2004

(30) Foreign Application Priority Data

Aug. 2, 2002 (DE) ............................... 102 35 656

(51) Int. Cl.
*G06K 9/00* (2006.01)
(52) U.S. Cl. .................................................. 382/128
(58) Field of Classification Search ........ 382/128–132; 378/62
See application file for complete search history.

(56) References Cited

U.S. PATENT DOCUMENTS

| | | | | |
|---|---|---|---|---|
| 4,674,046 A * | 6/1987 | Ozeki et al. | ................. | 382/131 |
| 4,989,142 A * | 1/1991 | Crawford | ..................... | 382/131 |
| 5,107,422 A * | 4/1992 | Kamentsky et al. | ......... | 382/133 |
| 5,696,837 A * | 12/1997 | Green | .......................... | 382/128 |
| 5,740,267 A * | 4/1998 | Echerer et al. | ............. | 382/132 |
| 6,205,243 B1 * | 3/2001 | Migdal et al. | .............. | 382/154 |

\* cited by examiner

*Primary Examiner*—Joseph Mancuso
*Assistant Examiner*—Hadi Akhavannik
(74) *Attorney, Agent, or Firm*—Houston Eliseeva LLP

(57) ABSTRACT

A method and an arrangement for automatic three-dimensional recording of structures of interest in a sample (15) are disclosed. The arrangement possesses a microscope having at least one microscope objective (13). The images of a sample (15) are acquired using a detector unit (19). A computer system (23) controls acquisition of the images and the microscope functions. The computer system (23) possesses a means (25) for automatically recording the entire marked specimen region in three dimensions.

12 Claims, 4 Drawing Sheets

US 7,221,784 B2

METHOD AND ARRANGEMENT FOR MICROSCOPY

CROSS REFERENCE TO RELATED APPLICATIONS

This application claims priority of the German patent application 102 35 656.4 which is incorporated by reference herein.

BACKGROUND OF INVENTION

The invention concerns a method for microscopy.

The invention further concerns an arrangement for microscopy, the arrangement encompassing at least one microscope objective, a detector unit for acquiring images of a sample, a display for displaying the images of the sample acquired by the detector unit, and a computer system for controlling the microscope and the data acquisition.

In microscopy and in confocal microscopy, the user him- or herself has hitherto been forced to define the parameters that are necessary for three-dimensional recording of a structure. This is often very difficult or almost impossible for an inexperienced user, since he or she does not have the necessary conceptual abilities. Even an experienced user often cannot locate structures within a sample on the basis of optical sections, resulting in incomplete recording of the desired structure.

SUMMARY OF INVENTION

It is the object of the invention to create a method which, by extensive automation, increases the user-friendliness and ergonomics of a microscope system and optimizes the three-dimensional recording of specimens.

This object is achieved by way of a method comprising the steps of:
  a) acquiring an image and identifying a region of interest of a sample within the image; and
  b) automatically recording the entire marked sample region in three dimensions.

It is the object of the invention to create a method which, by extensive automation, increases the user-friendliness and ergonomics of a microscope system and optimizes the three-dimensional recording of specimens.

This object is achieved by way of an arrangement comprising: a microscope with at least one microscope objective, a detector unit for acquiring images of a sample, a display for displaying the images of the sample acquired by the detector unit, a computer system controlling the microscope and a data acquisition process, a means for identifying the region of interest of the sample, and in the computer system a means for automatically recording the entire marked sample region in three dimensions.

It is particularly advantageous that a means for determining the region of interest of a sample is provided. Furthermore, the computer system encompasses a means for automatically recording the entire marked sample region in three dimensions. The entire three-dimensional extension of a selected structure can thus be accomplished automatically, and the user does not necessary need, for that purpose, knowledge of the spatial extension of the structure, and requires only minimal three-dimensional conceptual ability. The user can mark the structure of interest, for example, with a crosshairs, the crosshairs being overlaid on the image of the sample on the display. Another advantageous solution is that the means for determining the region of interest is a mouse cursor which can be moved around the region of interest of the sample on the display.

The method is advantageous because it makes possible automatic recording of the entire marked sample region in three dimensions. Extraction of the region of interest of a sample from a sectional image is accomplished by image analysis, and from that a list of specimen positions within the sectional image is constructed. A list of possible further specimen positions outside the sectional image is then defined. That list is successively tested by traveling to the possible specimen positions with the microscope, imaging them, and testing whether they belong to the specimen. For that purpose, a sub-list of possible further specimen positions that can be imaged in parallel fashion by the microscope is sequentially selected. Based on that list, a microscope position is traveled to that makes possible acquisition of a scene in which all the possible specimen positions of the sub-list are visible. After a data acquisition has been performed, the sub-list of possible specimen positions is matched to the acquired data, all possible specimen positions not belonging to the specimen are consequently eliminated, and the specimen positions and intensity values belonging to the specimen are stored.

Further advantageous embodiments of the invention are evident from the dependent claims.

BRIEF DESCRIPTION OF DRAWINGS

The subject matter of the invention is depicted schematically in the drawings and will be described below with reference to the Figures, in which.

DETAILED DESCRIPTION

Figure 1:
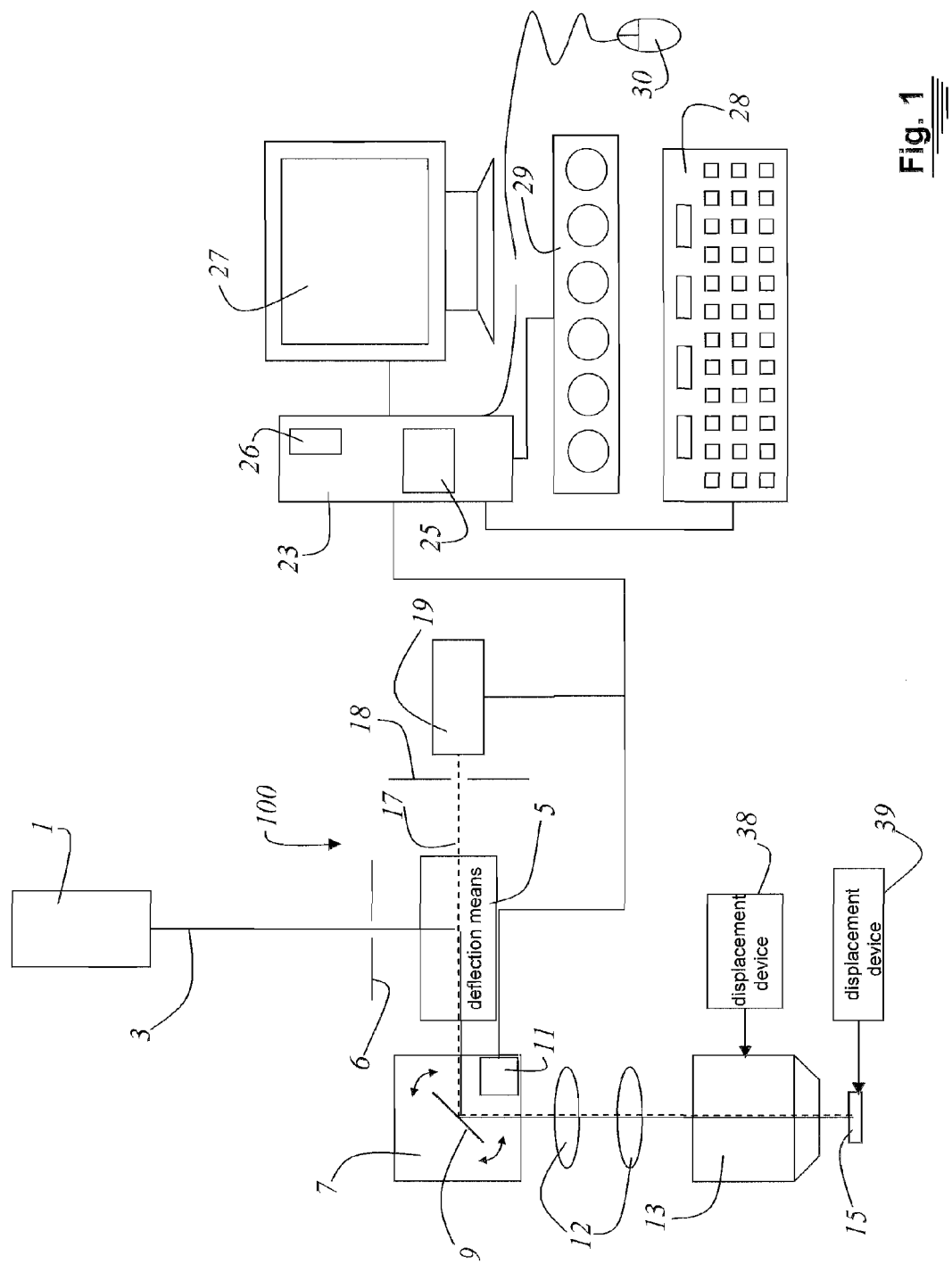
FIG. 1 is a schematic depiction of a scanning microscope.

FIG. 1 schematically shows an exemplary embodiment of a confocal scanning microscope 100. This is not to be construed as a limitation of the invention. It is sufficiently clear to one skilled in the art that the invention can also be implemented using a conventional microscope system. Illuminating light beam 3 coming from at least one illumination system 1 is directed by a beam splitter or a suitable deflection means 5 to a scanning module 7. Before illuminating light beam 3 strikes deflection means 5, it passes through an illumination pinhole 6. Scanning module 7 comprises a gimbal-mounted scanning mirror 9 that guides illuminating light beam 3 through a scanning optical system 12 and a microscope objective 13 over or through a sample 15. In the case of non-transparent specimens 15, illuminating light beam 3 is guided over the specimen surface. With biological samples 15 (preparations) or transparent specimens, illuminating light beam 3 can also be guided through sample 15. For that purpose, non-luminous preparations are optionally prepared with a suitable dye (not depicted, since established existing art). The dyes present in the specimen are excited by illuminating light beam 3 and emit light in a characteristic spectral region peculiar to them. This light proceeding from sample 15 defines a detected light beam 17. The latter travels through microscope optical system 13 and scanning optical system 12 and via scanning module 7 to deflection means 5, passes through the latter and arrives, through a detection pinhole 18, at at least one detector unit 19, which is embodied as a photomultiplier. It is clear to one skilled in the art that other detection components, for example diodes, diode arrays, photomultiplier arrays, CCD chips, or CMOS image sensors, can also be used. Detected light beam 17 proceeding from or defined by sample 15 is depicted in FIG. 1 as a dashed line. In detector 19, electrical detected signals proportional to the power level of the light proceeding from specimen 15 are generated. Since, as already mentioned above, light of more than one wavelength is emitted from sample 15, it is useful to insert in front of the at least one detector unit 19 a selection means 21 for the spectrum proceeding from specimen 15. The data generated by detector unit 19 are forwarded to a computer system 23. At least one peripheral unit 27 is associated with computer system 23. One peripheral unit is embodied as a display 32 on which the user receives instructions for adjusting the scanning microscope and can view the current setup as well as the image data in graphical form. Also associated with computer system 23 is an input means comprising, for example, a keyboard 28, an adjusting apparatus 29 for the components of the microscope system, and a mouse 30.

Figure 2:
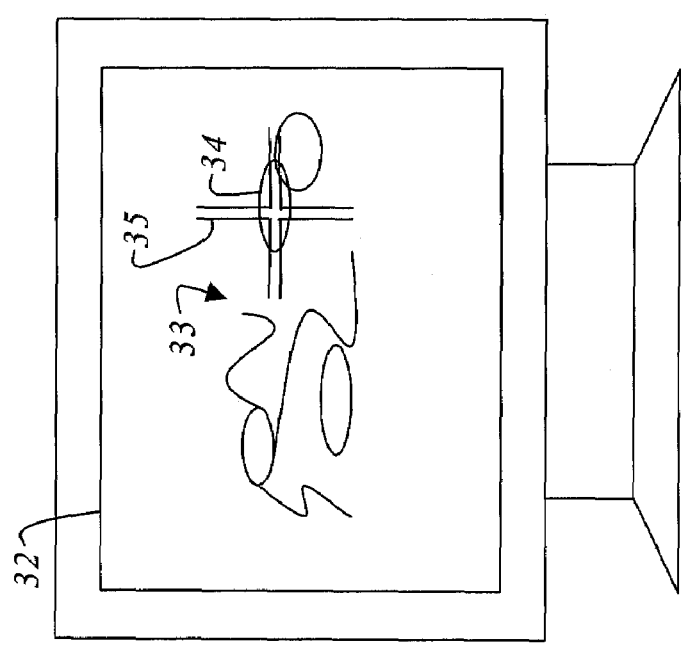
FIG. 2 shows a first variant of the selection of a desired structure on a display.

FIG. 2 depicts display 32 with a structured image 33 of specimen 15 reproduced on display 32. Structured image 33 of sample 15 represents a plane in sample 15 onto which microscope objective 13 is presently focused. In continuous scanning mode the user selects, for example, this one plane which shows him or her desired structure 34. The user is optionally assisted in the search for desired structure 34 by autofocus and autogain settings that the microscope system comprises per se. A crosshairs 35 is overlaid in display 32 for targeting onto desired structure 34. The user can thereby obtain, from structured image 33 of sample 15, the first image that contains desired structure 34. The computer system encompasses a means 25 for automatically recording the entire marked specimen region. Means 25 for automatically recording the entire marked specimen region in three dimensions can be configured in the form of hardware and software. In a further embodiment, means 25 for automatically recording the entire marked specimen region in three dimensions is implemented in the form of a software module.

Figure 3:
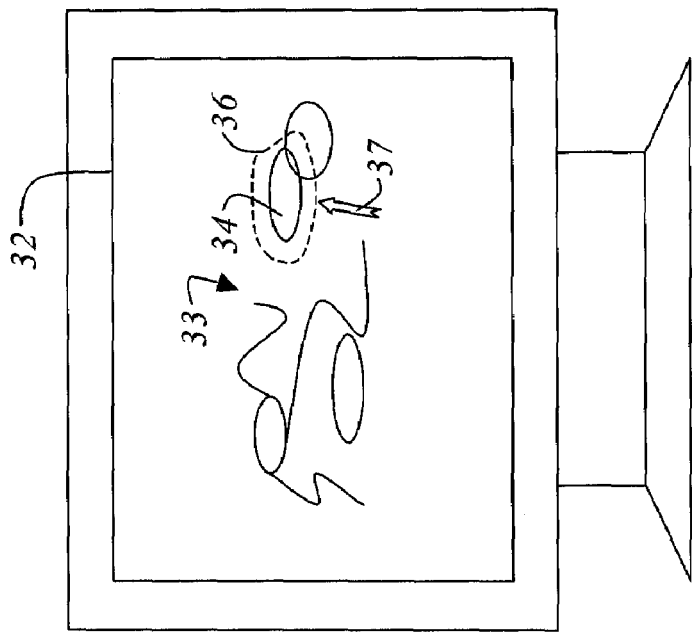
FIG. 3 shows a second variant of the selection of a desired structure on a display.

FIG. 3 depicts another exemplary embodiment for selecting a desired structure 34. In continuous scanning mode the user selects, for example, this one plane which shows him or her desired structure 34. In order to mark the desired structure 34, the user can draw a line 36 around desired structure 34. Continuous line 36 can be drawn using, for example, the mouse or a joystick provided for the purpose. If the mouse is used for drawing, a drawing function can be assigned to a mouse cursor 37 by way of a click button on display 32.

Figure 4:
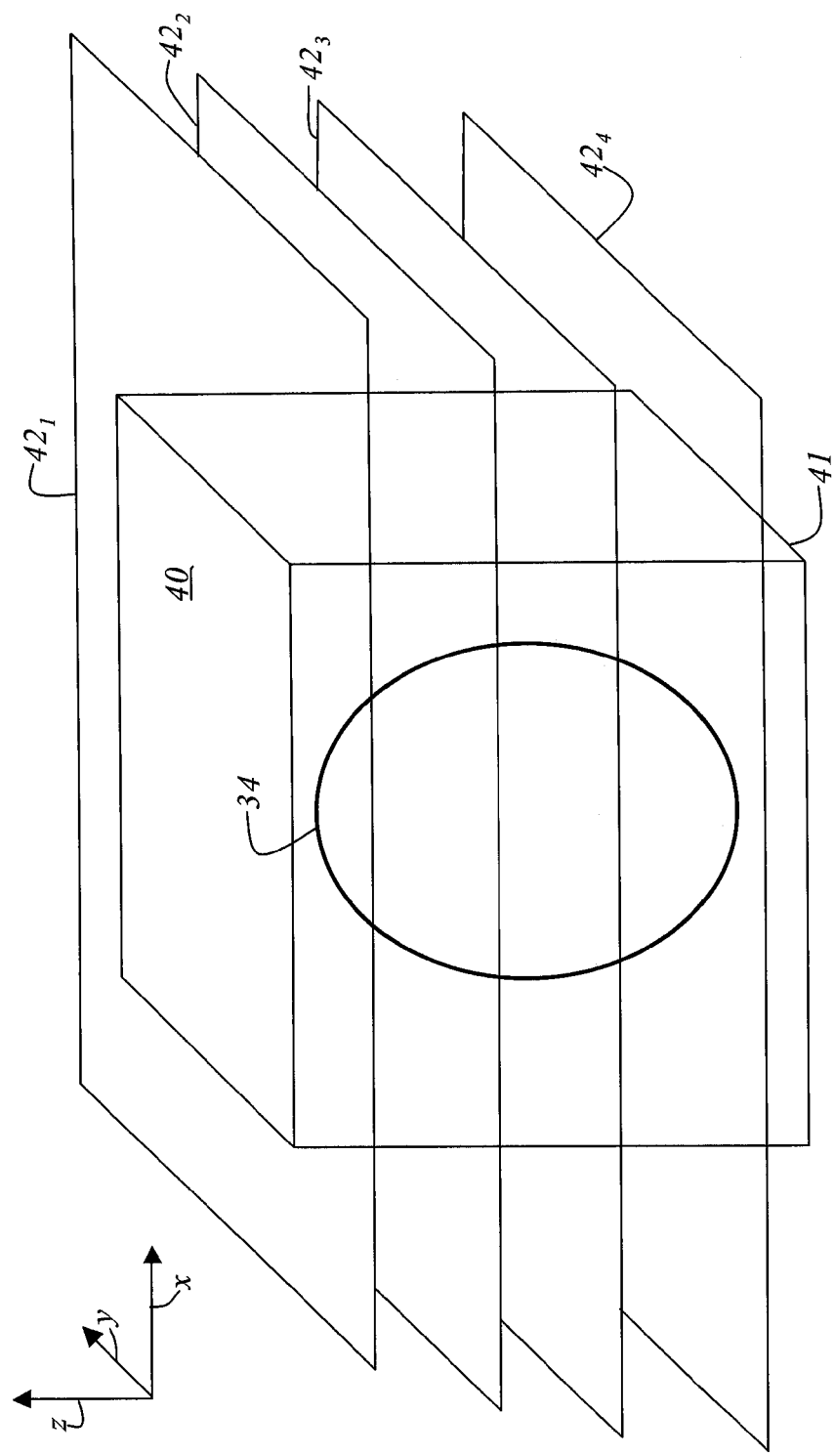
FIG. 4 schematically depicts the desired structure, in three dimensions, in a sample volume.
Figure 5B:
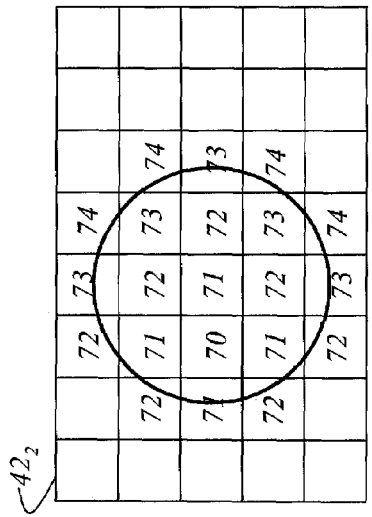
FIG. 5b graphically depicts a second plane that intersects the desired structure.
Figure 5D:
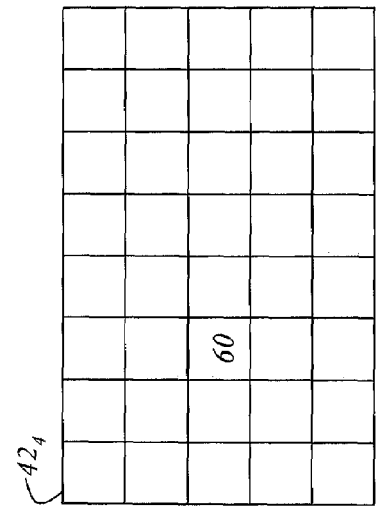
FIG. 5d graphically depicts a fourth plane that intersects the desired structure.
Figure 5A:
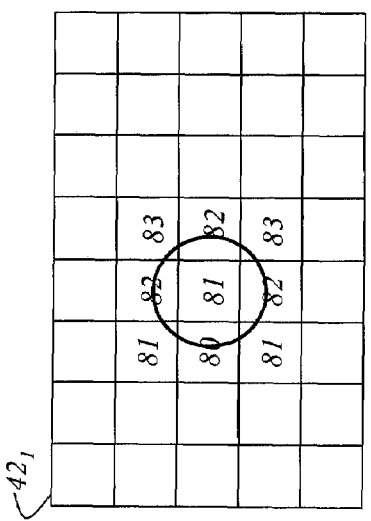
FIG. 5a graphically depicts a first plane that intersects the desired structure.
Figure 5C:
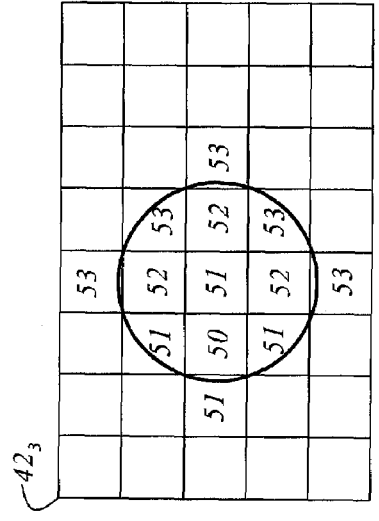
FIG. 5c graphically depicts a third plane that intersects the desired structure.

As already discussed in the description with reference to FIGS. 2 and 3, desired structure 34 or the region of interest of the sample is selected by the user. The microscope system then performs an automatic recording of the entire marked specimen region in three dimensions, i.e. the selected structure, and only that one, is recorded in all three spatial directions X, Y, and Z. In FIG. 4, desired structure 34 selected by the user is depicted in an enclosing sample volume 40. Sample volume 40, and thus selected structure 34 as well, is intersected by multiple, equally spaced planes $42_1$, $42_2$, $42_3$, and $42_4$. Planes $42_1$, $42_2$, $42_3$, and $42_4$ are parallel to XY plane 41 of sample volume 40. The user selects a plane within sample volume 40. The selected plane corresponds to the plane onto which the microscope system is focused, and which contains the region of interest of the sample depicted on display 32. Extraction of the region of interest, or of the selected structure, of a sample is accomplished by image analysis. A list containing the specimen positions is constructed. The specimen positions are determined by way of the XY coordinates in the image frame. The location of the planes and their spacing results from the optimum Z resolution of microscope objective 13 in use at the time. By way of an appropriate code on the usable objectives, computer system 23 of the microscope system can automatically perform the calculation of the optimum Z resolution of microscope objective 13. Acquisition of a scene is achieved using means 7, 38, 39 for arriving at the microscope position. The means for arriving at a possible microscope position is made possible by a displacement device 38 for the microscope objective in the Z direction and a displacement device 39 for the microscope stage in the XY plane. In a scanning microscope, the means for arriving at a possible microscope position is implemented by way of a displacement device 38 for microscope objective 13 in the Z direction and scanning module 7, which scans sample 15 in the XY plane. A combination of scanning module 7, displacement device 38 for microscope objective 13, and displacement device 39 for the microscope stage is also conceivable for arriving at a desired microscope position.

FIGS. 5a through 5d depict, in plan view, the individual planes $42_1$, $42_2$, $42_3$, and $42_4$ of FIG. 4. Planes $42_1$, $42_2$, $42_3$, and $42_4$ are subdivided into multiple pixels 45 of identical size. Pixels 45 have a finite extension and represent the size of the successive scan regions. In FIGS. 5a through 5d, pixels 45 are depicted as two-dimensional. It is self-evident, however, that the pixels can also be three-dimensional voxels. The user has, for example, focused on third plane $42_3$, so that initially one possible specimen position 50 has been found in this plane by means of suitable image processing. Proceeding from the possible specimen position 50, further specimen positions 51 are searched for in the immediate vicinity around the possible specimen position. The search is initially confined only to the selected plane $42_3$. From the search, a list of possible further specimen positions is generated. These further specimen positions 51 are then labeled with reference character 51 only if, for further specimen position 51, at least a portion of the selected structure is located within a pixel. The procedure continues accordingly on the basis of further specimen positions 51, and additional specimen positions 52, which likewise contain at least one pixel of the desired structure, are generated. The conditions for labeling with reference character 52 are the same as for the specimen positions labeled 51. Proceeding from specimen positions 52, specimen positions 53 are searched for. This continues until no further pixels containing at least a portion of the selected structure can be found in the selected plane $42_3$. All of the specimen positions that contain a portion of selected structure 34 are entered in a sub-list of specimen positions that can be acquired in parallel fashion by the microscope. In compiling the sub-list, care is taken that none of the pixels having a desired structure 34 is counted twice. The last step is to travel to a microscope position which allows acquisition of a scene in which all possible specimen positions on the sub-list are visible. Data acquisition is then performed in the selected plane $42_3$.

As already schematically depicted in FIG. 4, desired structure 34 extends not only in plane $42_3$ that has already been examined, but also onto planes $42_1$ and $42_2$. In plane $42_4$, the method finds no pixels in which at least some of the desired specimen positions 50, 51, 52, and 53 are located. Based on specimen positions 50, 51, 52, and 52 found in plane $42_3$, the list of possible specimen positions is expanded into planes $42_1$ and $42_2$. Proceeding from the specimen position, the method or microscope system searches in plane $42_4$ for further possible specimen positions. Since plane $42_4$ (FIG. 5d) contains no further possible specimen positions, all that is labeled here is possible specimen position 60, located opposite specimen position 50 from plane $42_3$. The search for possible specimen positions in this plane can be discontinued, since no further specimen positions containing desired structure 34 are found.

When the search is also extended to plane $42_2$ lying above plane $42_3$, a pixel having specimen position 70, which corresponds to specimen position 50 of plane $42_3$, is selected. Since a pixel containing at least a portion of desired structure 34 is found here, the number 70 is entered for that pixel. The search for possible further specimen positions is performed as already described above, by examining the nearest neighbors starting at possible specimen position 70. As a result, further specimen positions 71, 72, 73, and 74 that contain a portion of desired structure 34 are found in plane $42_2$. In searching for the nearest neighbors that contain at least a portion of the desired structure, it is important to ensure that double counting does not occur, i.e. that no specimen positions already previously identified in the plane as a specimen position are entered in the list.

Proceeding from plane $42_2$, the pixel having specimen position 70 is selected, and the search is extended from there in plane $42_1$. That pixel is selected as the starting point of a possible specimen position 80. Proceeding from specimen position 80, further possible specimen positions 81, 82, and 83 are identified.

It is self-evident that in the search for possible specimen positions, when the method or the microscope system finds a specimen position in a plane it also examines the specimen positions immediately adjacent to that plane.

The test implicit in these depictions, as to whether or not a pixel belongs to a specimen structure, can represent an entire class of functions from the field of image processing. In the simplest expression, a class is formed by way of the acquired intensity of the measurement point. As soon as the acquired value is greater than a threshold value T, the pixel is considered to belong to the specimen; otherwise it is discarded. This simplest decision is already sufficient for applications in fluorescence microscopy. In an advantageous expression of the invention, that threshold value is defined by the user. In an even more advantageous expression, the starting image is tested for multimodality, and an upper and a lower threshold value are defined based on the values. Computer-assisted methods that do this are, for example, the Otso method or recursively operating entropy maximization for grayscale images. The literature concerning pattern recognition (e.g. Duda, Hart, Pattern Classification, Wiley) discloses further mechanisms that function similarly; these are cited as existing art and regarded as interchangeable.

An even more advantageous expression adapts the selection of the threshold value by way of the data acquisition, the methods described above being substantially performed over adjacent previously-acquired test positions and weighted by comparison to the initial value.

For non-fluorescent microscopy, it may be advantageous to perform a data preprocessing operation by way of the intensities of the test positions in order to achieve an ideal separation using the method described above. The type of preprocessing depends greatly on the image modality and the contrast methods used.

The invention claimed is:

1. A method for recording of structures in microscopy, comprising the following steps:
    a) acquiring an image and identifying a region of interest of a sample within the image and selecting a plane within the sample comprising the region of interest by a user;
    b) extracting the region of interest by means of image analysis and constructing a list of specimen positions;
    c) defining a list of possible further specimen positions derived from the list of specimen positions;
    d) selecting a sub-list of the possible further specimen positions that can be imaged in parallel by a microscope;
    e) traveling to a microscope position which makes possible acquisition of a scene in which all possible specimen positions of the sub-list are visible;
    f) performing a data acquisition;
    g) matching the sub-list of possible specimen positions to the acquired data, eliminating all possible specimen positions not belonging to the specimen, and storing the specimen positions belonging to the specimen;
    h) expanding the list of possible further specimen positions based on the specimen positions, found in g), belonging to the specimen;
    i) repeating steps e) through h) as long as the list of possible further specimen positions contains elements; and
    j) automatically recording the entire marked sample region in three dimensions.

2. The method for microscopy as defined in claim 1, wherein selection of the region of interest of the sample is accomplished using crosshairs that is overlaid on the image of the sample on a display.

3. The method for microscopy as defined in claim 1, wherein selection of the region of interest of the sample is accomplished by delimiting the region of interest of the sample in the image of the sample displayed on a display.

4. The method for microscopy as defined in claim 1, wherein the list of specimen positions can be depicted as XYZ coordinates with reference to a voxel grid.

5. The method as defined in claim 1, wherein it comprises the further steps of a)generating a new sub-list of test positions on the basis of the identified specimen positions; b)incorporating the sub-list into the list of all hypothetical test positions, excluding duplicate entries and positions already traveled to.

6. The method as defined in claim 1, wherein the method for microscopy is used in a scanning microscope.

7. An arrangement for microscopy, comprising:
    a microscope with at least one microscope objective and a detector unit for acquiring images of a sample;
    a display for displaying the images of the sample acquired by the detector unit;
    a computer system controlling the microscope and a data acquisition process, the computer system comprising:

means for extracting a region of interest of the sample by image analysis and for constructing a list of specimen positions;

means for defining a list of possible further specimen positions and means for selecting a sub-list of possible further specimen positions that are imaged in parallel fashion by the microscope;

means for traveling to a microscope position to make possible acquisition of a scene in which all possible specimen positions of the sub-list are visible;

means for matching the sub-list of possible specimen positions to the acquired data;

means for eliminating all possible specimen positions not belonging to the specimen; and a memory that stores the specimen positions belonging to the sample;

means for identifying a region of interest of the sample, and in the computer system means for automatically recording an entire marked sample region in three dimensions.

8. The arrangement as defined in claim 7, wherein the means for automatically recording the entire marked sample region in three dimensions is a software module.

9. The arrangement as defined in claim 7, wherein the means for automatically recording the entire marked sample region in three dimensions is embodied in the form of hardware and software.

10. The arrangement as defined in claim 7, wherein the means for identifying the region of interest comprises crosshairs and the crosshairs being overlaid on the image of the sample on the display.

11. The arrangement as defined in claim 7, wherein the means for identifying the region of interest comprises a mouse cursor with which the region of interest of the sample can be delimited on the display.

12. The arrangement as defined in claim 7, wherein the microscope is a scanning microscope.

* * * * *